United States Patent [19]
Watanabe

[11] Patent Number: 5,025,368
[45] Date of Patent: Jun. 18, 1991

[54] MICROPROCESSOR WITH OPTION AREA ADJACENT CPU CORE FACILITATING INTERFACING WITH PERIPHERAL DEVICES

[75] Inventor: Nobuhisa Watanabe, Kanagawa, Japan

[73] Assignee: Sony Corporation, Tokyo, Japan

[21] Appl. No.: 810,192

[22] Filed: Dec. 18, 1985

[30] Foreign Application Priority Data

Dec. 27, 1984 [JP] Japan .............................. 59-281592
Dec. 27, 1984 [JP] Japan .............................. 59-281593
Dec. 27, 1984 [JP] Japan .............................. 59-281594

[51] Int. Cl.[5] .......................................... G06F 15/76
[52] U.S. Cl. .................................. 364/200; 364/232.8; 364/491
[58] Field of Search ... 364/200 MS File, 900 MS File, 364/488, 489, 490, 491

[56] References Cited
U.S. PATENT DOCUMENTS

| 4,393,464 | 7/1983 | Knapp et al. ..................... 364/900 |
| 4,447,881 | 5/1984 | Brantingham et al. ............. 364/488 |
| 4,600,995 | 7/1986 | Kinoshita ........................... 364/491 |
| 4,649,474 | 3/1987 | Ambrosius, III et al. .......... 364/200 |

Primary Examiner—Thomas C. Lee
Attorney, Agent, or Firm—Ronald P. Kananen

[57] ABSTRACT

A novel microprocessor architecture can be easily interfaced with various peripheral devices. The microprocessor is generally made up of a CPU core, a RAM, a ROM and an input/output option. The RAM adjoins one edge of the CPU core and the ROM adjoins the opposite edge of the CPU core. The input/output (I/O) option adjoins a third edge of the CPU core and the parallel edges of the RAM and ROM. The input/output option is adapted to allow interfacing with various peripheral devices. The CPU core comprises CPU and segments commonly used to form a complete microprocessor. Such common segments may include a RAM address register facilitating access to the CPU by the peripheral devices.

18 Claims, 2 Drawing Sheets

MICROPROCESSOR WITH OPTION AREA ADJACENT CPU CORE FACILITATING INTERFACING WITH PERIPHERAL DEVICES

BACKGROUND OF THE INVENTION

The present invention relates generally to a novel microprocessor architecture. More specifically, the invention relates to a microprocessor architecture which can be easily accessed by an optional or a peripheral device. Still more specifically, the invention relates to a microprocessor architecture which makes application of single-chip microprocessors to domestic electrical appliances easier.

Known microprocessors generally comprise a central processing unit (CPU), a random-access memory (RAM), a read-only memory (ROM), an input/output (I/0) unit, an interrupt control register, a timer and so forth. In the case of a single-chip microprocessor, the aforementioned segments are all mounted on a single substrate, such as a silicon chip. Such microprocessors also are frequently available with one or more different peripheral input/output units in order to form a complete microprocessor.

In the prior art, the microprocessor architecture is not designed to accept various peripheral input/output units. This makes it difficult to interface with different kinds of peripheral input/output units. Specifically, in order to make the chip compatible with a different set of peripheral devices, significant changes in microprocessor architecture are required since a change in the peripheral devices requires changes in the instruction set, the instruction decoder, and the arrangement of the RAM and the ROM to suit the new peripheral devices. Such changes require significant design work and take a long time. This results in rather high chip development costs.

SUMMARY OF THE INVENTION

Therefore, it is a principle object of the present invention to provide a novel microprocessor architecture which can be easily interfaced with various peripheral devices.

In order to accomplish the above-mentioned and other objects, a microprocessor, according to the present invention, is generally composed of a CPU core, a RAM, a ROM and an input/output option. The RAM is disposed on one side of the CPU core and the ROM is disposed on the other side of the CPU core. The input/output option adjoins the CPU core and the RAM and the ROM. The input/output (I/O) option is designed to allow interfacing with various peripheral devices.

In the preferred structure, the CPU core comprises a CPU and segments commonly used to form a complete microprocessor. These common segments may include a RAM address register facilitating access to the CPU by the peripheral devices.

According to one aspect of the invention, a microprocessor architecture comprises a CPU core having a first, second and third peripheral edges, which first and second peripheral edges are located on opposite sides of the CPU core and connected by the third peripheral edge, the RAM adjoining the first peripheral edge of the CPU core, the ROM adjoining the second peripheral edge of the CPU core, and an input/output option capable of interfacing with various peripheral devices and adjoining the third peripheral edge of the CPU core and parallel peripheral edges of the RAM and ROM.

The CPU core comprises an instruction decoder adjoining the second peripheral edge. The CPU core further comprises various function blocks respectively lying perpendicular to the first and second peripheral edges and arranged side-by-side and parallel to each other.

The function blocks lie essentially parallel to the input/output option. The function blocks includes a timer register and a serial input/output register. The function blocks all have the same bit length and essentially same number of bytes.

The microprocessor further comprises a plurality of peripheral input/output units interfacing with the input/output option, and the RAM has an address bus which also serves to address the peripheral input/output units.

The CPU core has a RAM address decoder for locating addresses in the peripheral input/output units, which RAM address decoder has address decoding lines extending into the input/output option.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only.

In the drawings.

DESCRIPTION OF THE PREFERRED EMBODIMENT

Figure 1:
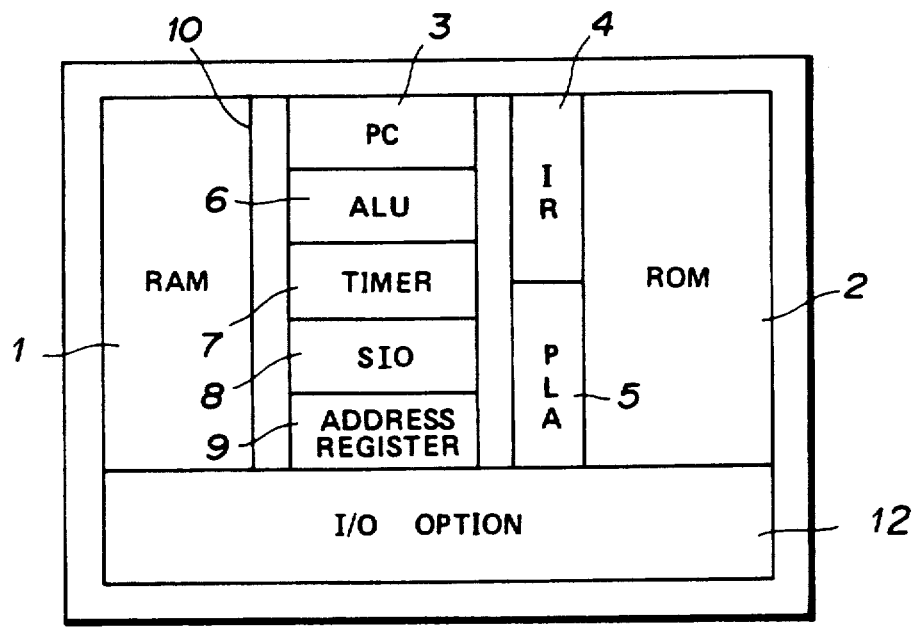
FIG. 1 shows the preferred embodiment of a single-chip microprocessor architecture according to the present invention.

Referring now to the drawings, particularly to FIG. 1, the preferred embodiment of a single-chip microprocessor comprises, a RAM 1, a ROM 2, a program counter (PC) 3, an arithmetic/logic operation unit (ALU) 6, an instruction register (IR) 4, an instruction decoder (PLA) 5, a timer 7, a serial input/output unit 8 and an address register 9. The program counter 3, the arithmetic/logic operation unit 6, the instruction register 4 and the instruction decoder 5 are combined to form the CPU. In addition, the timer 7, the serial input/output unit 8 and the address register 9 are combined with the CPU to form a CPU core 10.

As shown in FIG. 1, the foregoing segments are arranged on a substrate 11, such as a silicon chip. RAM 1, CPU core 10 and ROM 2 are arranged side-by-side with RAM 1 and ROM 2 disposed on opposite sides of the CPU core 10. Within the CPU core 10, the instruction register 4 and the instruction decoder 5 adjoin ROM 2 along one edge of the CPU core 10. The instruction register 4 and the instruction decoder 5 together form a decoder area.

The program counter 3, the arithmetic/logic unit 6, the timer 7, the serial input/output unit 8 and the address register 9 lie parallel to each other along the other side of the CPU core 10.

It should be appreciated that although it is not illustrated on the drawings, working registers, stack areas, indirect addressing data pointer and so forth will be allocated in RAM 1.

An input/output option 12 adjoins one edge of the CPU core 10 and also adjoins the parallel edges of RAM 1 and ROM 2. The input/output option 12 is designed to interface with a peripheral device or devices.

Figure 2:
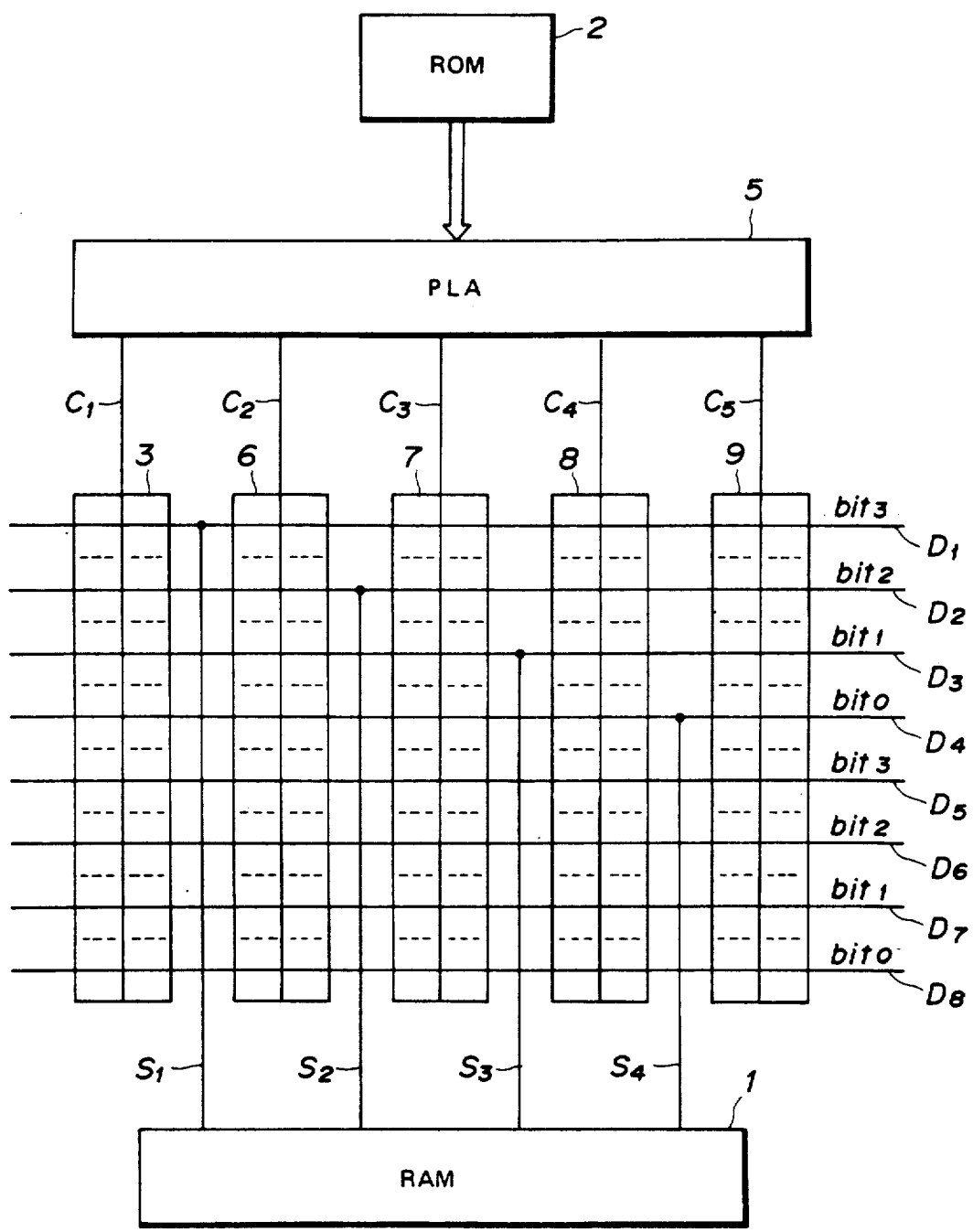
FIG. 2 shows the arrangement of some segments of the preferred embodiment of the microprocessor of FIG. 1.

As shown in FIG. 2, the program counter 3, the arithmetic logic operation unit 6, the timer 7, the serial input/output unit 8 and the RAM address register 9 are all of the same number of bytes and the same number of bits per byte. Structurally, they have the form of identical blocks. In the shown embodiment, each of the blocks is made up of 8 cells for handling 8-bit data. Each cell of each block is connected for input and output with corresponding cells of the other blocks. Data bus $D_1$-$D_8$ made up of parallel metal lines extends across the aligned cells of all of the blocks. In the data bus, the bus lines $D_1$-$D_4$ are referred to as the even data bus and bus lines $D_5$-$D_8$ are called the odd data bus. Control lines $C_1$-$C_4$ extend from the instruction decoder 4 along respectively corresponding blocks 3, 6, 7, 8 and 9 essentially perpendicular to the data bus. The only even data bus $D_1$-$D_4$ is connected to RAM through signal lines $S_1$-$S_4$.

As will be appreciated, the CPU core 10 may also include additional function blocks, such as a status flag register, a temporary register, the accumulator and so forth. Such function blocks will also be of the same byte-size and block-size. In cases where some function blocks have a greater and smaller byte-size than the others, the cells of the bigger blocks in excess of the standard number can be coupled with the smaller blocks to form standard blocks. For instance, assuming the program counter 3 has 13 bit cells and the status register has 3 bits, the upper 5 bits of the program counter 3 may be combined with the 3 bits of the status register to form an 8-bit function block.

By arranging at least some of the function blocks of the CPU core into identical bit-cell blocks and arranging the same in a regular pattern, the area needed for the function blocks is minimized, due in part to the fact that less area is needed for connecting lines, such as data bus, control lines and signal lines.

Figure 3:
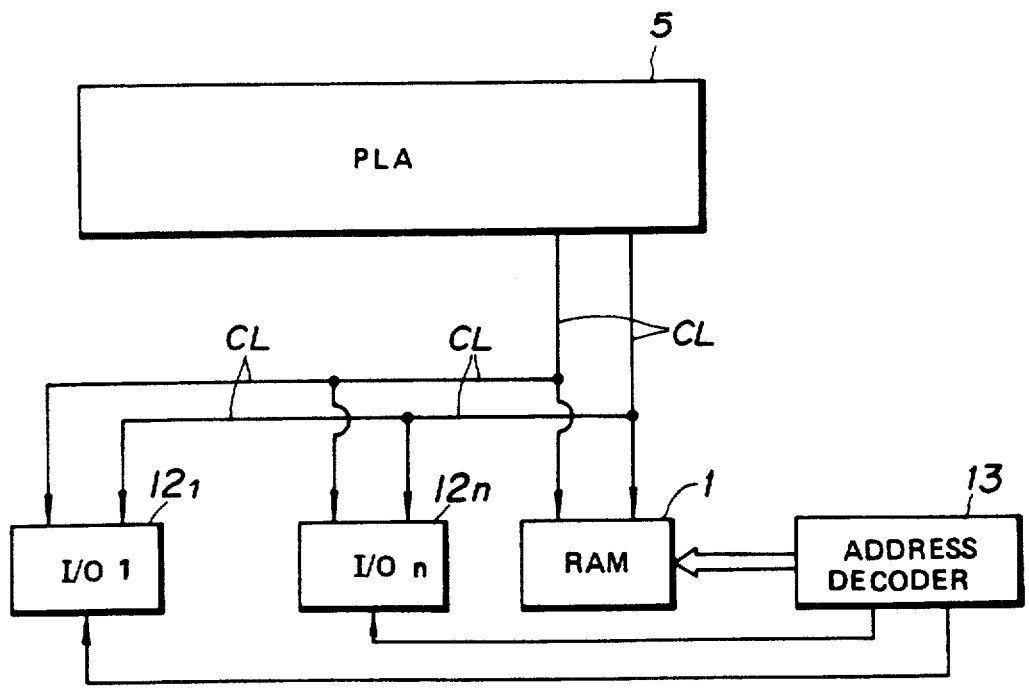
FIG. 3 is a schematic block diagram of connections between an instruction decoder and peripheral input/output units.

FIG. 3 shows an alternative embodiment of the microprocessor architecture according to the invention. In this alternative embodiment, address accessing in the peripheral input/output unit or units $12_1$....$12_n$, which are to be connected to the microprocessor through the input/output option 11, is mediated by the same bus used for RAM 1. In this case, the signal lines $S_1$-$S_4$ (FIG. 2) are connected to the instruction decoder 5 branch and connect to the peripheral input/output units $12_1$....$12_n$ in parallel with RAM 1. Therefore, control signals for reading from and writing into the RAM can be used in common for the peripheral input/output units $12_1$....$12_n$. In this case, an address decoder 13 will be provided for addressing in the peripheral input/output units.

With the foregoing alternative embodiment, the read/write signal for RAM can be commonly used for the peripheral input/output unit. Therefore, only addressing signals are necessary for interfacing with the peripheral input/output units. This means only the address decode line or lines need be available for interfacing with peripheral devices.

Consequently, in order to interface various peripheral devices, it is not necessary to change the structure of the CPU core. Furthermore, when writing software, instructions to the accumulator, RAM and so forth for arithmetic/logic operation, bit processing and so forth will be applicable to all of the accumulators and input/output units in common and, also, all of the addressing modes used to access operands will be applicable to all of the input/output units. This provides greater flexibility in program design.

As will be appreciated herefrom, according to the present invention, interfacing with various peripheral devices will be easier without need for significant change to the microprocessor architecture and/or instruction set. Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A microprocessor having architecture comprising:
   a CPU core having a first, second and third peripheral edges, which first and second peripheral edges are located on opposite sides of said CPU core and connected by said third peripheral edge;
   a RAM adjoining said first peripheral edge of said CPU core;
   a ROM adjoining said second peripheral edge of said CPU core; and
   an input/output option structurally adapted for interfacing with various peripheral devices and adjoining said third peripheral edge of said CPU core and parallel peripheral edges of said RAM and ROM.

2. The microprocessor architecture as set forth in claim 1, wherein said CPU core, comprises an instruction decoder adjoining said second peripheral edge.

3. The microprocessor architecture as set forth in claim 2, wherein said CPU core further comprises various function blocks respectively lying perpendicular to said first and second peripheral edges and arranged side-by-side and parallel to each other.

4. The microprocessor architecture as set forth in claim 3, wherein said function blocks lie about parallel to said input/output option.

5. The microprocessor architecture as set forth in claim 4, wherein said function blocks include a timer register.

6. The microprocessor architecture as set forth in claim 4, wherein said function blocks include a serial input/output register.

7. The microprocessor architecture as set forth in claim 4, wherein said function blocks all have the same bit length and essentially the same number of bytes.

8. The microprocessor architecture as set forth in claim 1, which further comprises a plurality of peripheral input/output units interfacing with said input/output option, and said RAM has an address bus which also addresses said peripheral input/output units.

9. The microprocessor architecture as set forth in claim 7, wherein said CPU core has a RAM address decoder for locating addresses in said peripheral input- /output units, which RAM address decoder has address decoding lines extending into said input/output option.

10. A microprocessor having architecture which is structurally adapted for embodiment on a single chip and for conveniently interfacing with various peripheral devices through an I/O option comprising:
- a CPU core structurally arranged on said substrate and comprising elements defining first, second, and third peripheral edges, said first and said second peripheral edges being located on opposite sides of said CPU core, said third peripheral edge connecting said first and said second peripheral edges;
- a RAM structurally positioned on said substrate adjacent said first peripheral edge of said CPU core;
- a ROM structurally positioned on said substrate and adjoining said second peripheral edge of said CPU core, opposite said first peripheral edge and said RAM; and,
- said I/O option for interfacing various peripheral devices located on said substrate adjoining said third peripheral edge of said CPU core and peripheral edges of both said RAM and said ROM.

11. The microprocessor architecture as set forth in claim 10, wherein said CPU core comprises an instruction decoder adjoining said second peripheral edge.

12. The microprocessor architecture as set forth in claim 10, wherein said CPU core further comprises various function blocks respectively lying perpendicular to said first and second peripheral edges and arranged side-by-side and parallel to each other.

13. The microprocessor architecture as set forth in claim 10, wherein said function blocks lie about parallel to said input/output option.

14. The microprocessor architecture as set forth in claim 10, wherein said function blocks include a timer register.

15. The microprocessor architecture as set forth in claim 10, wherein said function blocks include a serial input/output register.

16. The microprocessor architecture as set forth in claim 10, wherein said function blocks all have the same bit length and essentially the same number of bytes.

17. The microprocessor architecture as set forth in claim 10, wherein further comprises a plurality of peripheral input/output units interfacing with said input/output option, and said RAM has an address bus which also addresses said peripheral input/output units.

18. The microprocessor architecture as set forth in claim 10, wherein said CPU core has a RAM address decoder for locating addresses in said peripheral input/output units, which RAM address decoder has address decoding lines extending into said input/output option.

* * * * *